United States Patent
Merrill

(10) Patent No.: US 11,078,973 B2
(45) Date of Patent: Aug. 3, 2021

(54) BRAKE CALIPER POSITIONAL CORRECTION DEVICE

(71) Applicant: Compagnie Generale des Etablissements Michelin, Clermont-Ferrand (FR)

(72) Inventor: Zachary Alexander Merrill, Greenville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 81 days.

(21) Appl. No.: 16/632,667

(22) PCT Filed: Aug. 4, 2017

(86) PCT No.: PCT/US2017/045565
§ 371 (c)(1),
(2) Date: Jan. 21, 2020

(87) PCT Pub. No.: WO2019/027474
PCT Pub. Date: Feb. 7, 2019

(65) Prior Publication Data
US 2020/0224736 A1 Jul. 16, 2020

(51) Int. Cl.
*F16D 65/095* (2006.01)
*F16D 55/225* (2006.01)
(Continued)

(52) U.S. Cl.
CPC ....... *F16D 55/225* (2013.01); *F16D 65/0056* (2013.01); *F16D 65/0068* (2013.01);
(Continued)

(58) Field of Classification Search
CPC ...... B60B 35/04; B60G 3/265; B60G 21/051; F16D 55/225; F16D 65/40; F16D 65/091; F16D 65/095
(Continued)

(56) References Cited

U.S. PATENT DOCUMENTS 9,669,680 B2 * 6/2017 Yuta .................. B62D 17/00
10,260,580 B2 * 4/2019 Merrill .................. B60G 9/00
(Continued)

FOREIGN PATENT DOCUMENTS

WO 2016081629 A1 5/2016
WO 2017040029 A1 3/2017

OTHER PUBLICATIONS

European Patent Office; International Search Report and Written Opinion for patent application PCT/US2017/045565; dated Apr. 17, 2018; Publisher: European Patent Office, Rijswijk, Netherlands, pp. 1-11, enclosed.

*Primary Examiner* — Christopher P Schwartz
(74) *Attorney, Agent, or Firm* — Neal P. Pierotti

(57) ABSTRACT

An apparatus for a vehicle is provided that has a spindle sleeve (12) with a spindle sleeve inner surface axis (14) that is coaxial with the axis of an axle (16). The spindle sleeve (12) has a spindle sleeve outer surface axis (20) that is oriented at an angle to the axis of the axle. A hub (28) is present that has a hub axis (30) that is coaxial with the spindle sleeve outer surface axis (20). A rotor (32) is coaxial with the hub axis (30) and brake calipers (34) are carried by the axle. A brake caliper positional correction device (36) is present and is carried by the axle (16) and has a correction surface (38) that carries the brake calipers (34). The correction surface (38) orients the brake calipers (34) such that the brake calipers (34) are properly positioned with respect to the rotor (32).

13 Claims, 5 Drawing Sheets

(51) Int. Cl.
*F16D 65/00* (2006.01)
*F16D 65/40* (2006.01)
*F16D 55/00* (2006.01)

(52) U.S. Cl.
CPC ...... *F16D 65/40* (2013.01); *F16D 2055/0008* (2013.01); *F16D 2055/0016* (2013.01)

(58) Field of Classification Search
USPC ...... 188/17, 18 A, 18 R, 721, 205 R, 206 A, 188/206 R; 301/105.1, 124.1, 126, 131
See application file for complete search history.

(56) References Cited

U.S. PATENT DOCUMENTS

2004/0074713 A1* 4/2004 Beattie .................. F16D 65/092
188/73.46
2017/0341478 A1* 11/2017 Merrill ................... B60G 3/265

* cited by examiner

BRAKE CALIPER POSITIONAL CORRECTION DEVICE

CROSS-REFERENCE TO RELATED APPLICATIONS

The present application is a 35 U.S.C. § 371 application of PCT/US17/45565 filed on Aug. 4, 2017 and entitled "Brake Caliper Positional Correction Device" and claims the benefit thereof. PCT/US17/45565 is incorporated by reference herein in its entirety for all purposes.

FIELD OF THE INVENTION

The subject matter of the present invention relates to a brake caliper centering and positional geometry correction device. More particularly, the present application involves a device for correcting the positioning of calipers for disc brakes that are incorporated into a system that has a wheel hub that is angled relative to the axle that carries the wheel hub.

BACKGROUND OF THE INVENTION

The alignment of a vehicle's wheel plane relative to the path traveled by the vehicle affects not only the handling of the vehicle but also affects the wear on the tires. As used herein, alignment refers to camber, toe, and thrust. Camber is the angle between the vertical axis of the wheel and the vertical axis of the vehicle. Positive camber refers to an angle where the top of the wheel is farther away from the center of vehicle than the bottom of the wheel. Negative camber refers to an angle where the bottom of the wheel is farther away from center of the vehicle than the top. Generally speaking, camber changes of even a fourth of one degree can impact tire wear. Abnormal tire wear has been observed in certain applications with even smaller camber angles changes. Toe is the angle each wheel makes with the longitudinal axis of the vehicle. Positive toe, also referred to as toe in, is a condition where the front of the wheel is pointing in or towards the center line of the vehicle. Negative toe, also referred to as toe out, is a condition where the front of the wheel points out or away from the center line of the vehicle. Generally speaking, toe changes of even one-tenth of a degree can have an impact on tire wear. Thrust is the resulting direction of travel of an axle as opposed to the direction that might be expected from the orientation of the tires on the axle.

Brake systems for vehicles may employ disc brakes that include a caliper brake and a rotor. The rotor can be rigidly attached to a wheel hub that rotates on an axle so that rotation of the wheel hub causes rotation of the rotor. The caliper brake is positioned on either side of the rotor and when actuated engages the rotor to in turn force the rotor to stop which likewise causes the axle to cease rotation. If the angle of the rotor changes relative to the axle then the caliper brake does align with the rotor. When actuated, the caliper brake may engage the rotor at an angle and stop the rotor, but this may result in uneven wear of the caliper brake. One way to fix this misalignment is by way of shaping the caliper brake so they have a positioning that matches the positioning of the new angle of the rotor. Another way of adjusting the caliper brakes so that they match the new angle of the rotor is to machine the axle in a particular way so that the attached caliper brakes are then aligned with the rotor. Although current ways of adjusting caliper brakes relative to rotors are known, these ways are challenging and are not very practical. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
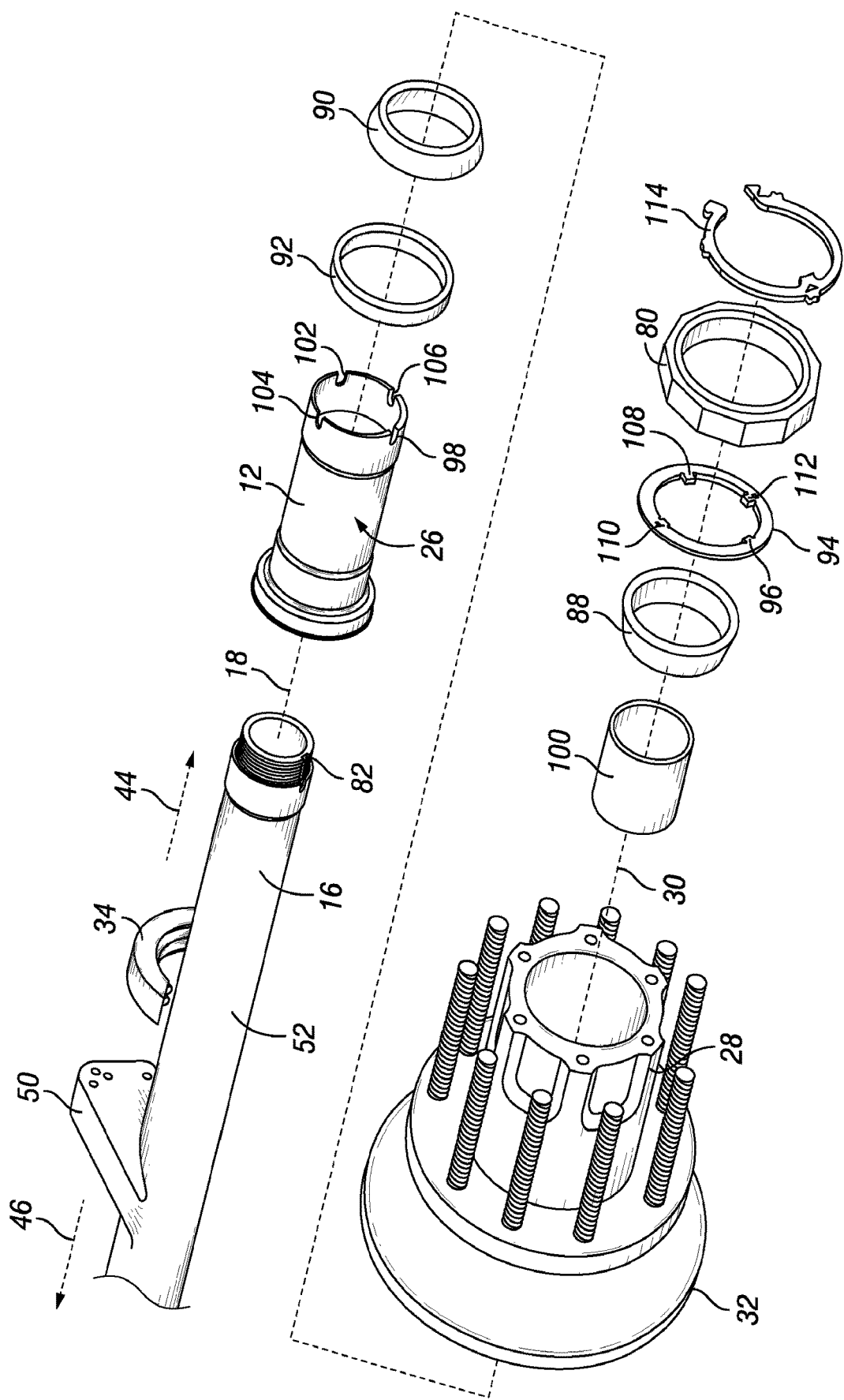
FIG. 1 is a partial exploded view of a hub orientation correctional system.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for an apparatus 10 for a vehicle that has spindle sleeve 12 that reorients a hub 28 relative to an axle 16 so that the tire carried by the hub 28 is in turn reoriented on the vehicle to achieve improved wear characteristics. The apparatus 10 includes a brake caliper positional correction device 36 that orients a brake caliper 34 of the disc brake section of the vehicle so that the brake caliper 34 is placed into proper alignment/position with a rotor 32 of the disc brake section.

FIG. 1 provides an embodiment of an apparatus 10 for adjusting the alignment of the axis of rotation of a hub 28 relative to a spindle sleeve 12 attached at the end of an axle 16. The hub 28 is retained on the axle 16 usually by way of an axle nut, also referred to as a spindle nut 80, which engages a threaded end 82 of the spindle sleeve 12. In this particular embodiment, the spindle sleeve 12 and hub 28 are typical to what may be observed on a heavy vehicle such as a truck trailer, but it should be understood that the apparatus 10 disclosed could be used with other vehicle types.

Figure 2:
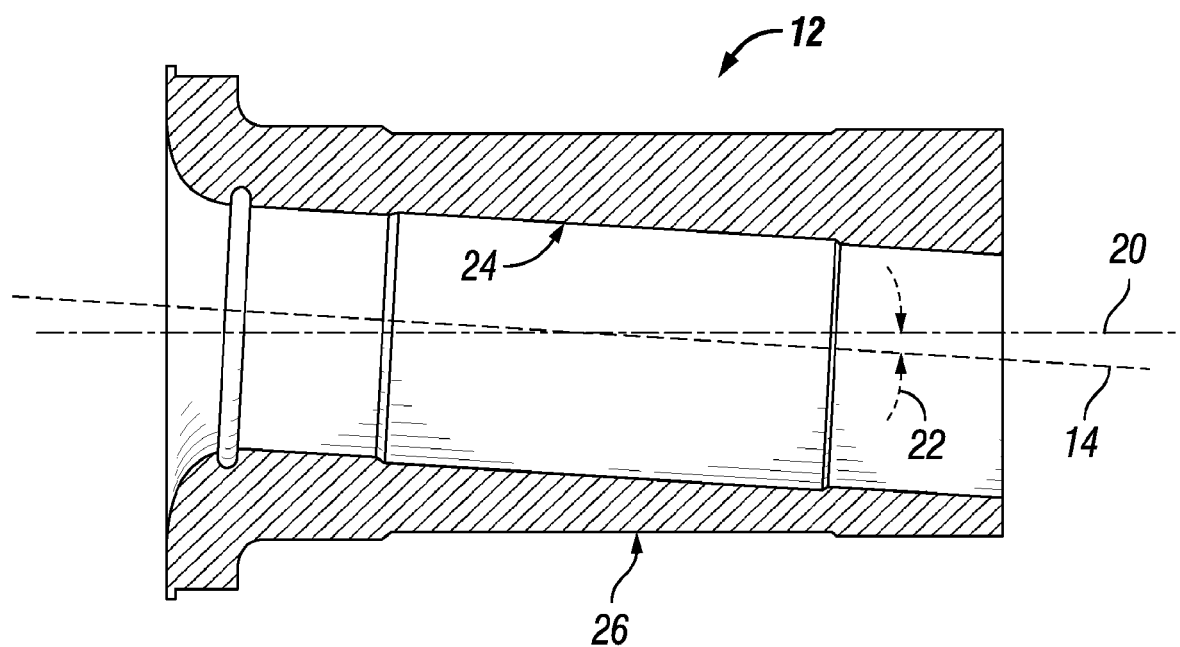
FIG. 2 is a cross-sectional view of a sleeve.

The spindle sleeve 12 causes the angular orientation of the hub 28 to be changed relative to that of the axle 16. FIG. 2 is a cross section view of the spindle sleeve 12. The spindle sleeve 12 has an outer surface 26 centered upon a spindle sleeve outer surface axis 20. The spindle sleeve 12 has an inner surface 24 machined to a diameter so as to fit over the outer surface of the axle 16. The inner surface 24 of the spindle sleeve 12 is a generally cylindrical surface of revolution about a spindle sleeve inner surface axis 14. When the spindle sleeve 12 is mated with the axle 16, the spindle sleeve inner surface axis 14 of the inner surface 24 and the axis 18 of the axle 16 are positionally and angularly aligned to one another such that the axes 14 and 18 are coaxial.

The spindle sleeve outer surface axis 20 of the outer surface 26 is oriented at a predetermined angle 22 and position relative to the spindle sleeve inner surface axis 14 of the inner surface 24. This predetermined angle 22 may be in a vertical direction (inducing a positive or negative change in camber) or horizontal direction (inducing a positive or negative change in toe) or a combination thereof (inducing a positive or negative change in camber and inducing a positive or negative change in toe). It should be appreciated that while the value of the difference in angle 22 between the spindle sleeve outer surface axis 20 and the spindle sleeve inner surface axis 14 is nonzero, the difference in angle may be nonzero when viewed in a particular direction. For example the difference in angle may be zero in the horizontal where no change in toe is occurring while having a positive or negative change in angle in the vertical direction where a change in camber is occurring. The angle 22 between the spindle sleeve inner surface axis 14 and the spindle sleeve outer surface axis 20 is chosen depending upon the desired adjustment of the camber, toe and thrust angle of the hub 28 (and attached wheel). The vertical and horizontal placement of the spindle sleeve inner and outer surfaces 24 and 26 is determined by choosing the intersection point of the inner surface axis and outer surface axis. Although described has having a non-zero angle 22, it is to be understood that in some embodiments the angle 22 may in fact be zero. In these instances, the inclusion of the spindle sleeve 12 will not cause a change in camber, toe or thrust angle to occur between the hub 28 and the axle 16.

The vertical and horizontal placement and the angular alignment of the spindle sleeve outer surface axis 20 relative to the spindle sleeve inner surface axis 14 is limited to the thickness of the spindle sleeve 12 walls. The walls must be sufficiently thick so as not to deform during handling of the spindle sleeve 12, installation of the spindle sleeve 12 upon the axle 16, or operation of the vehicle as the loads are transmitted from the vehicle through the axle 16, spindle sleeve 12, bearings 72 and 90, hub 28 and to the road surface.

With reference back to FIG. 1, some torque can be expected to act upon the spindle sleeve 12 and axle 16, for example, such torque may be created by the friction of the bearings 88, 90, seals 92, or lubricant. The spindle sleeve 12, being mounted on the axle 16 with a spindle sleeve outer surface axis 20, would be free to rotate about axis 18 if not otherwise prevented to do so. In the embodiment shown, a special washer 94, shaped so as not to rotate on the spindle sleeve 12 engages the spindle sleeve 12 preventing the spindle sleeve 12 from rotating relative to the axis 18. The washer 94 possesses a tooth 96 protruding radially inward which passes through a slot 98 in the outboard end of the spindle sleeve 12. The tooth 96 extends past the outer surface 26 of the spindle sleeve 12 into a keyway formed along the outboard end of the axle 16. Any rotational forces against the spindle sleeve 12 are transmitted to the washer 94 in this embodiment, which transmits the rotational forces to the spindle sleeve 12 which is rotationally fixed relative to the vehicle by the vehicle's suspension. Note that while it is said that the axle 16 is "rotationally fixed," it is still anticipated that the vehicle suspension linkage may allow some rotation of the axle 16 as the suspension accommodates road surfaces and vehicle loads. For example, such rotation may occur in a suspension system attached to a vehicle with a trailing arm. Any such rotation would be over a relatively small angle and the change in camber, toe and thrust would have a very minor contribution to the overall alignment of the wheel.

The washer 94 possesses an outboard surface aligned perpendicular to the axis 18 and an inboard surface aligned perpendicular to the spindle sleeve outer surface axis 20. The angle between the outboard and inboard surfaces may be the same as angle 22. The angled opposing faces on the washer 94 enable the outboard surface of the washer 94 to engage the inboard surface of the spindle nut 80 and the inboard face of the washer 94 to engage the outboard face of the outboard bearing cone 88 evenly distributing the axial forces around the circumference of the respective faces.

A bearing spacer 100 allows excess axial forces to transfer through the spacer 100 and not through the bearings 88, 90 to "preset" the bearing preload. This bearing spacer 100 is machined to exact dimensions and matched relative to the dimensions of the hub 28 that define the spacing between the inboard bearing 90 and outboard bearing 88. It should be understood, that while this embodiment incorporates a bearing spacer 100 for ease of installation and ensuring proper bearing preload, other embodiments may omit the spacer 100.

The seal 92 is pressed on the inboard portion of the spindle sleeve 12 and inboard portion of the hub 28. A seal retaining lip protrudes radially outward from the outer surface 26 and provides a physical stop so that the seal 92 is not pushed off the inboard end of the spindle sleeve 12. The seal 92 illustrated here is a unitized type seal, but other types may be employed in other embodiments such as non-unitized positive contact lip seals. A spindle sleeve 12 to axle 16 seal should ideally be formed to prevent leakage of any bearing lubricant, such as oil or grease, from the inner workings of the hub 28. In this particular embodiment, a groove is formed on the inner surface 24 of the spindle sleeve 12 and the seal is an O-ring. The groove receives the O-ring which presses against the outer surface of the axle 16 forming a seal. Alternatively, or in addition, a sealant such as an RTV silicone gasket product may be applied to achieve a seal, with or without the groove and/or O-ring.

The spindle sleeve 12, shown in this embodiment, possesses a plurality of slots 98, 102, 104, 106 that align with and receive corresponding spindle sleeve washer teeth 96, 108, 110, 112. In this embodiment, three of the teeth 108, 110, 112 extend the thickness of the spindle sleeve 12 wall at their respective locations. One spindle sleeve washer tooth 96 extends past the thickness of the spindle sleeve 12 wall and extends into the axle keyway. Engagement of the tooth 96 into the keyway prevents rotation of the spindle sleeve 12 about the axis 18. One manner to identify the position of the spindle teeth 96, 108, 110, 112 and corresponding slots 98, 102, 104, 106 is to assign the radially oriented positions about the axis 18 or tire into degrees and specifying an azimuth angle from a set point, such as top vertical point above the axis, or referencing a horizontal line intersecting the axis.

The spindle nut 80 shown here is a locking spindle nut having a spindle nut lock ring 114. The spindle nut lock ring 114 may help prevent the spindle nut 80 from backing off of the threaded end 82. Other spindle nuts from that disclosed may be used within the scope of the claimed apparatus 10, including using a castle nut, a nut and retaining washer, or dual nut and a lock plate.

The spindle sleeve 12 functions to change the angle of the axis 30 of the hub 28 so that the hub axis 30 is at the angle 16 to the axis 18 of the axle 16. A disc brake system may be used to stop rotation of the hub 28, and thus the carried tire, about the axle 16. The disc brake system includes a rotor 32 that is rigidly attached to the hub 28 and is positioned inboard from the hub 28. A tube or other member may be used to position the rotor 32 inboard of the hub 28 and effect rigid attachment of the rotor 32 to the hub 28. The disc brake system also includes brake calipers 34 that are rigidly attached to the axle 16 and that function to engage the rotating rotor 32 and stop rotation of the rotor 32. The axle 16 has a caliper mounting bracket 50 onto which the brake calipers 34 are mounted. The caliper mounting bracket 50 may be attached to the shaft 52 of the axle 16 through forging. The caliper mounting bracket 50 can be integrally formed with the shaft 52 or may be a separate component that is subsequently attached thereto. Further, in some embodiments, the brake calipers 34 can be directly attached to the shaft 52 such that a caliper mounting bracket 50 is not present.

Figure 3:
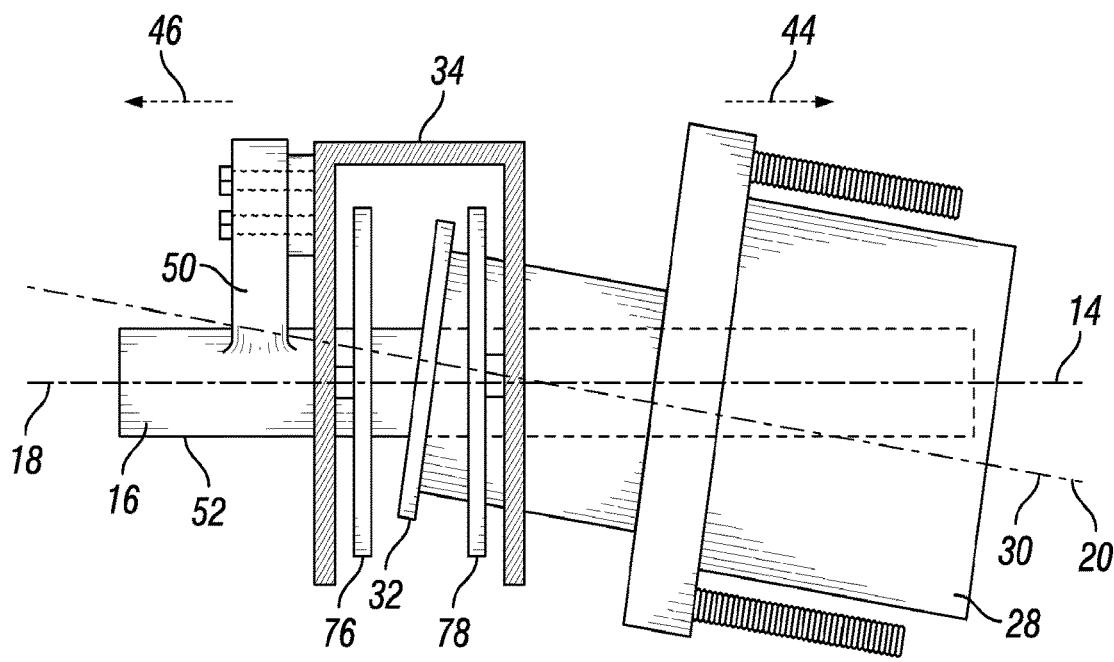
FIG. 3 is a side view of a disc brake section of the hub orientation correctional system in which the brake pads are not aligned with the rotor.

FIG. 3 shows the hub 28 and attached rotor 32 mounted onto the axle 16. The spindle sleeve 12 is angled thus causing the hub axis 30 to be angled relative to the axis 18 of the axle 16. The brake calipers 34 are mounted to the caliper mounting bracket 50 and include a pair of brake pads 76, 78. The first brake pad 76 is inboard of the rotor 32 in the inboard direction 46 of the axle 16. The second brake pad 78 is outboard of the rotor 32 in the outboard direction 44 of the axle 16. The inclusion of the spindle sleeve 12 causes the rotor 32 to be misaligned with the brake pads 76, 78. In this regard, the spindle sleeve 12 has a lip or other material that repositions the rotor 32 in the outboard direction 44. The rotor 32 is thus moved closer to the second brake page 78 and farther from the first brake pad 76. Additionally, the inclusion of the angle 22 causes the hub 28 and thus the rotor 32 to be angled relative to the axle 16. The rotor 32 is thus angled out of alignment with the surfaces of the brake pads 76, 78 due to the adjustment of the camber, toe, and/or thrust angle of the hub 28.

Figure 4:
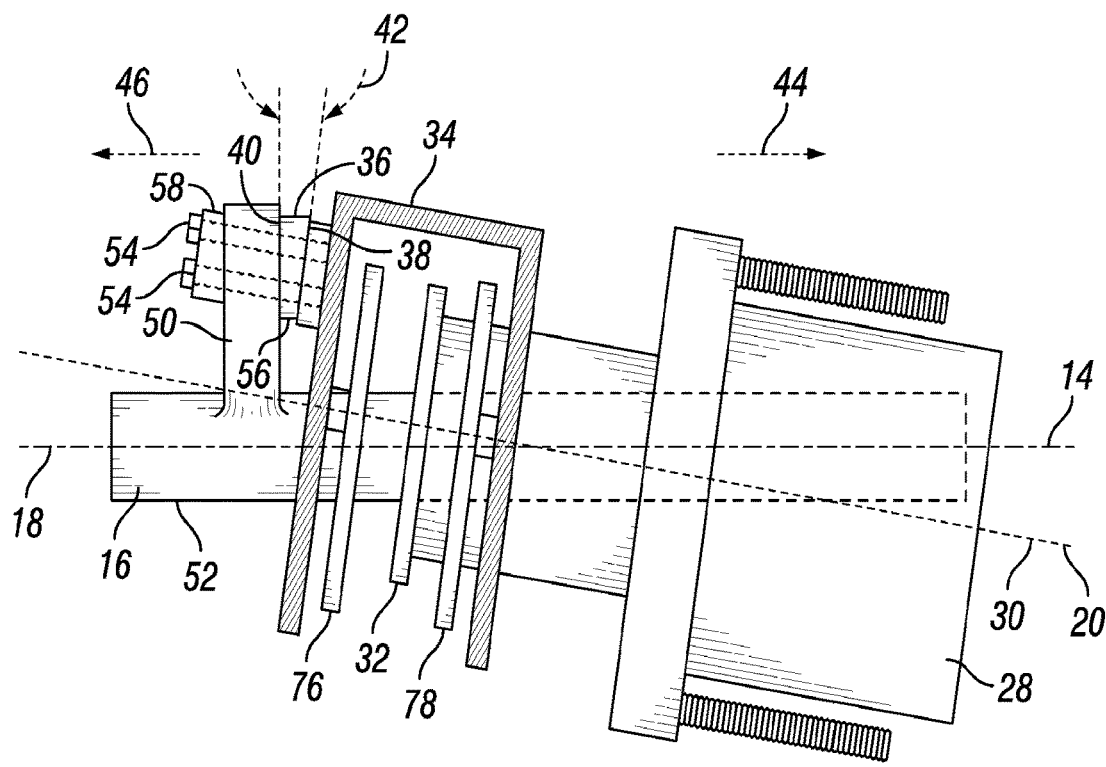
FIG. 4 is a side view of the disc brake section of FIG. 3 in which the positioning of the brake pads has been corrected.

A brake caliper positional correction device 36 may be used in the apparatus 10 in order to correct the positioning of the rotor 32 so that it is properly positioned relative to the brake pads 76, 78. FIG. 4 shows the inclusion of the brake caliper positional correction device 36 to reorient the brake calipers 34. The brake caliper positional correction device 36 has a correction surface 38 that engages the brake calipers 34. In the illustrated embodiment, the brake calipers 34 have a mounting bracket, and the correction surface 38 engages this mounting bracket. The brake caliper positional correction device 36 has a back surface 40 that is oppositely disposed from the correction surface 38 and that engages the caliper mounting bracket 50. The engagement between the outboard surface of the caliper mounting bracket 50 and the back surface 40 may be flush. The back surface 40 is angled at a brake caliper positional correction device angle 42 to the correction surface 38. The brake caliper positional correction device angle 42 causes the brake calipers 34, and thus the first and second brake pads 76, 78 to assume the correct orientation relative to the previously oriented rotor 32. Additionally, the brake calipers 34 and the brake pads 76, 78 will be moved in the outboard direction 44 due to the inclusion of the brake caliper positional correction device 36 to match the previously stated relocation of the rotor 32 in the outboard direction 44. The rotor 32 in FIG. 4 is thus spaced equal distance from the first brake pad 76 and the second brake pad 78 and is oriented at the same angle as the brake pads 76, 78 so that actuation of the brake calipers 34 cause the brake pads 76, 78 to engage the rotor 32 flush by traveling the same distance.

Figure 5:
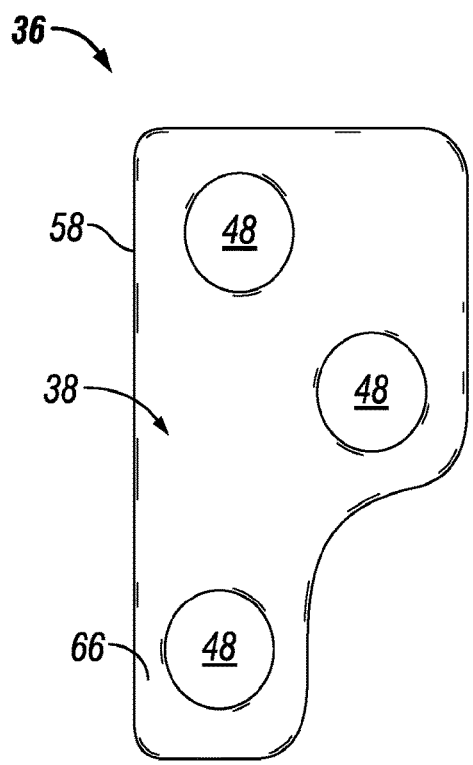
FIG. 5 is a front view of a correction surface of a brake caliper positional correction device.
Figure 6:
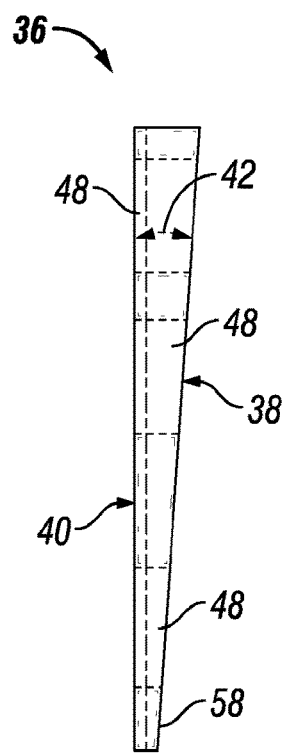
FIG. 6 is a side view of the brake caliper positional correction device of FIG. 5.
Figure 7:
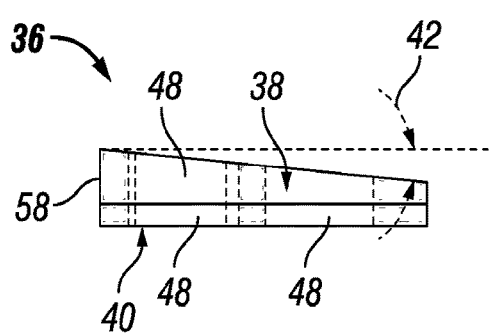
FIG. 7 is a bottom view of the brake caliper positional correction device of FIG. 5.

An example of the brake caliper positional correction device 36 is illustrated with reference to FIGS. 5-7. The correction surface 38 is shown in FIG. 5, and three mounting bolt holes 48 extend completely through the brake caliper positional correction device 36 from the correction surface 38 to the back surface 40. Mounting bolts 54 may extend through the mounting bolt holes 48 to mount the brake calipers 34 onto the caliper mounting bracket 50. The brake caliper positional correction device 36 may be made out of aluminum or steel or any sturdy, rigid material that allows for the mounting of the brake calipers 34. Depending upon where the caliper mounting bracket 50 is located on the axle 16 the brake caliper positional correction device angle 42 may be a single angle in that it only extends in one direction on the correction surface 38, or may be a compound angle in that it extends more than one direction on the correction surface 38. As shown in FIGS. 5-7 the brake caliper positional correction device angle 42 is a compound angle. FIG. 6 is a side view of the front face of the brake caliper positional correction device 36 shown in FIG. 5. The brake caliper positional correction device angle 42 shown in FIG. 6 extends from the bottom to the top of the brake caliper positional correction device 36 at a constant amount. With reference now to FIG. 7, this view shows the bottom of the brake caliper positional correction device 36 and the previously described angle 42 shown in FIG. 6 is also visible in that the height of the correction surface 38 decreased front to back. However, a second brake caliper positional correction device angle 42 is also illustrated and is an angle that extends from the left side to the right side so that the correction surface 38 moves downward left to right in FIG. 7. As shown in this example, the brake caliper positional correction device angle 42 is a compound angle in that the correction surface 38 may be angled both left to right, and top to bottom. In other instances, the angle 42 may only be in the left to right direction, or may be only in the top to bottom direction when the angle 42 is not a compound angle. The brake caliper positional correction device angle 42 is selected in order to cause proper positioning of the brake calipers 34 relative to the rotor 32. Although illustrated as a non-zero angle, it is to be understood that the brake caliper positional correction device angle 42 may be zero in some embodiments. These embodiments may be when the spindle sleeve 12 causes the rotor 32 to be displaced in the outboard direction 44, but there is no change in angle induced by the spindle sleeve 12. A brake caliper positional correction device 36 that affects an offset in the outboard direction 44 may be used, that likewise has a zero degree brake caliper positional correction device angle 42.

Figure 8:
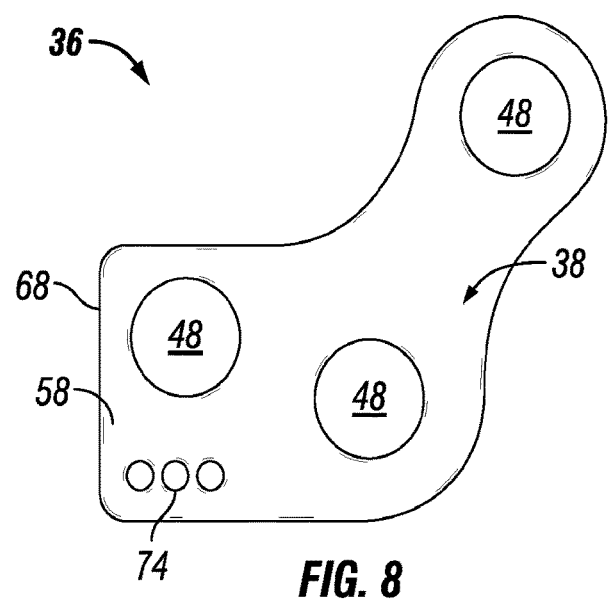
FIG. 8 is a front view of a correction surface of a lower outboard component of a brake caliper positional correction device.

FIG. 8 shows another arrangement of the brake caliper positional correction device 36 in that its geometry is different from the one shown in FIGS. 5-7. The brake caliper positional correction device 36 may be configured based upon the location of the mounting points of the caliper brakes 34. In this regard, the brake caliper positional correction device 36 may be a single piece, a pair of pieces, three pieces, four pieces, or any number of pieces as is necessary. In one embodiment, the brake caliper positional correction device 36 is made up of four pieces. Written indica can be placed onto the correction surface 38 to identify the size and placement position of the particular piece in question. However, it may be the case that written indicia becomes worn off or obscured due to the fact that trucks or other vehicles operate in dirty conditions. A series of identification holes 74 may be present through the brake caliper positional correction device 36 in order to identify the particular size or positional location of that piece of the brake caliper positional correction device 36. The fact that three identification holes 74 are present may indicate, for instance, that the particular piece is the lower outboard component 68 of the brake caliper positional correction device 36. Any identification indicia can be provided on the particular piece of the brake caliper positional correction device 36 to identify its associated angle, the appropriate brake type application, and the piece installation position as the pieces of the brake caliper positional correction device 36 may each be position specific, angle specific, and orientation specific.

Figure 9:
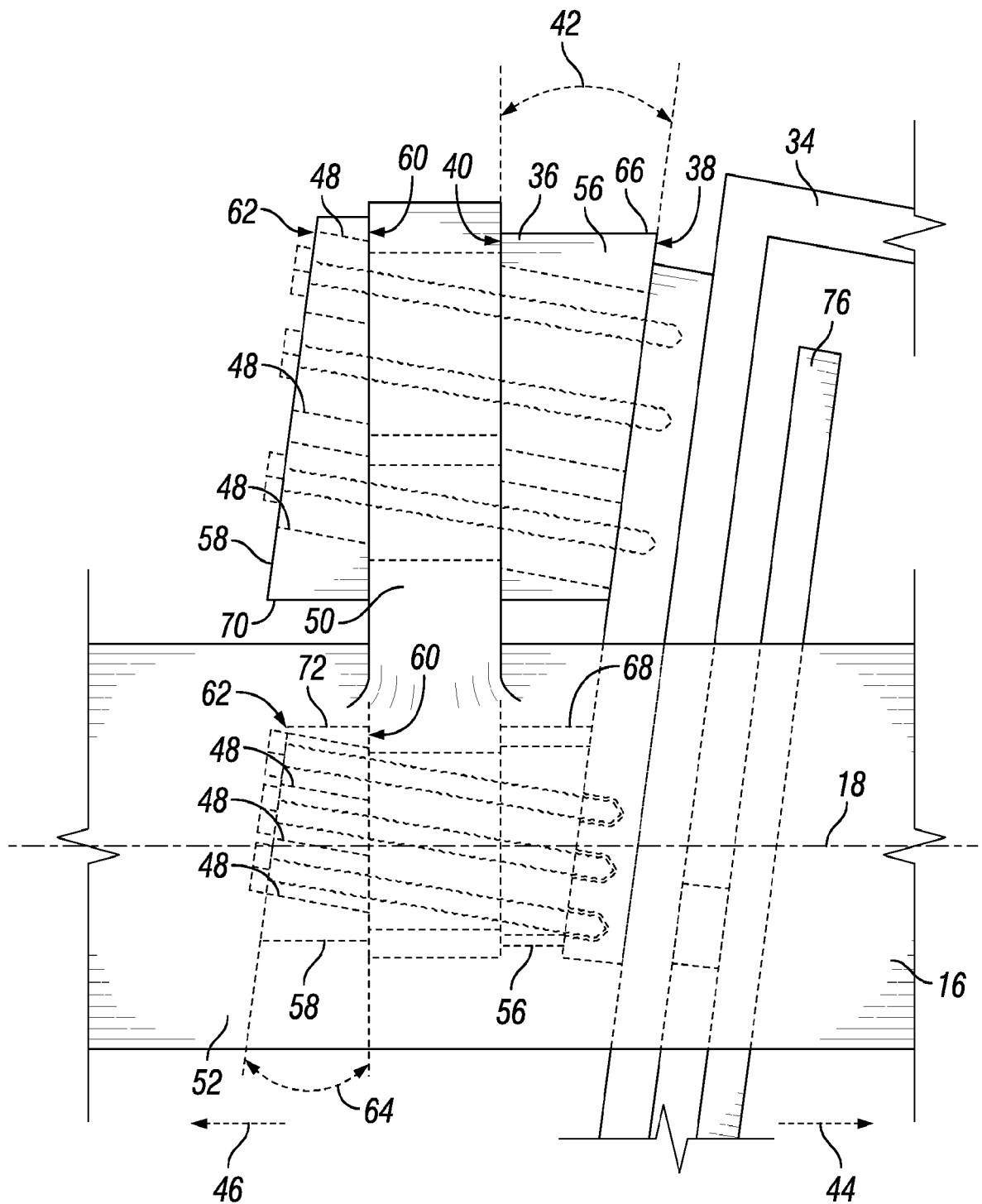
FIG. 9 is a side view of a disc brake section in which the brake caliper positional correction device is made of four components.

FIG. 9 shows an embodiment of the apparatus 10 in which the brake caliper positional correction device 36 is made up of both an outboard component 56 and an inboard component 58. The outboard component 56 is located in the outboard direction 44 from the caliper mounting bracket 50 and directly engages the mounting points of the brake caliper 34. The correction surface 38 is located on the outboard component 56. Due to the size of the caliper mounting bracket 50, the outboard component 56 is not one piece but is instead made up of both an upper outboard component 66 and a lower outboard component 68. The two components 66 and 68 are spaced from one another and do not contact one another. The correction surface 38 is located on both the upper and lower outboard components 66, 68.

It may be the case that the mounting bolts 54 have external threading that is engaged by complimentary internal threading within apertures of the brake calipers 34. Due to the fact that the positioning of the caliper mounting bracket 50 is adjusted relative to the brake calipers 34, the mounting bolts 54 will not be properly set on the caliper mounting bracket 50 if they are inserted. In this regard, the brake caliper positional correction device 36 is provided with an inboard component 58 that is located inboard from the caliper mounting bracket 50 in the inboard direction 46. The inboard component 58 functions to adjust the seating surface of the mounting bolts 54 so that they will correctly seat when fastened into the apparatus 10. The inboard component 58 is made up of an upper inboard component 70 and a lower inboard component 72 that are separated from one another and that do not contact one another. The inboard component 58 has a caliper mounting bracket engagement surface 60 that engages the caliper mounting bracket 50 and is located on both the upper and lower inboard components 70 and 72. The caliper mounting bracket engagement surface 60 is flush with its contact points on the caliper mounting bracket 50. An oppositely disposed bolt mounting surface 62 is located on the inboard component 58 and is at both the upper and lower inboard components 70, 72. The bolt mounting surface 62 is located at an angle 64 to the caliper mounting bracket engagement surface 60. The angle 64 may be the same angle as the brake caliper positional correction device angle 42 in some instances. The angle 64 is selected so that the mounting bolts 54 are flush with the bolt mounting surface 62.

The apparatus 10 is shown with six mounting bolts 54, but any other number may be present in other exemplary embodiments. The mounting bolts 54 are disposed through the mounting bolt holes 48 of the upper and lower inboard components 70, 72 which are not threaded. The mounting bolts 48 then go through the holes in the caliper mounting bracket 50 which are likewise not threaded. The mounting bolts 48 may be misaligned and not coaxial with the holes that go through the caliper mounting bracket 50. The mounting bolts 48 then go through the unthreaded mounting bolt holes 48 of the upper and lower outboard components 66, 68. Next, the mounting bolts 48 extend into the threaded apertures of the brake calipers 34 and engage this internal threading in order to lock the brake caliper positional correction device 36 to the caliper mounting bracket 50 and to the brake calipers 34. Due to the provision of the upper and lower inboard components 70, 72 the heads of the mounting bolts 48 are tightened flush against the bolt mounting surface 62 to help secure the connection.

Although described as having four components 66, 68, 70, 72 and threaded mounting bolts 54 that engage internal threading of the brake calipers 34, various other types of attachment designs are possible. For example in some embodiments the mounting bolts 54 may first extend through the brake calipers 34 and then into the caliper mounting bracket 50 or the brake caliper positional correction device 36. Further, although three mounting bolts 54 are present at the top of the brake caliper positional correction device 36, and three mounting bolts 54 are present at the bottom of the brake caliper positional correction device 36, any number are possible in other embodiments.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. An apparatus for a vehicle, comprising:

a spindle sleeve with a spindle sleeve inner surface axis that is coaxial with the axis of an axle, wherein the spindle sleeve has a spindle sleeve outer surface axis that is oriented at an angle to the axis of the axle, wherein the spindle sleeve has an inner surface and an outer surface;

a hub that has a hub axis that is coaxial with the spindle sleeve outer surface axis, wherein a rotor is coaxial with the hub axis and wherein brake calipers are carried by the axle; and a brake caliper positional correction device that is carried by the axle and has a correction surface that carries the brake calipers, wherein the correction surface orients the brake calipers such that the brake calipers are properly positioned with respect to the rotor;

wherein the axle has a caliper mounting bracket rigidly attached to a shaft of the axle, wherein the brake caliper positional correction device is attached to the caliper mounting bracket by a plurality of mounting bolts;

wherein the brake caliper positional correction device has an outboard component and an inboard component, wherein the correction surface is located on the outboard component, wherein the outboard component engages the caliper mounting bracket such that the correction surface does not engage the caliper mounting bracket, wherein the inboard component engages the caliper mounting bracket such that the caliper mounting bracket is located outboard from the inboard component and such that the caliper mounting bracket is located inboard from the outboard component.

2. The apparatus of claim 1, wherein the angle the spindle sleeve outer surface axis is oriented with respect to the spindle sleeve inner surface axis is greater than zero degrees.

3. The apparatus of claim 1, wherein the correction surface faces the brake calipers.

4. The apparatus of claim 3, wherein the correction surface engages the brake calipers.

5. The apparatus of claim 1, wherein the brake caliper positional correction device has a back surface that is oppositely disposed to the correction surface, wherein the back surface is oriented at a brake caliper positional correction device angle to the correction surface, wherein the brake caliper positional correction device angle is greater than zero.

6. The apparatus of claim 1, wherein the brake caliper positional correction device angle is a compound angle.

7. The apparatus of claim 1, wherein the brake caliper positional correction device positions the brake calipers in an outboard direction of the axle.

8. The apparatus of claim 1, wherein the brake caliper positional correction device has a plurality of holes through which the plurality of mounting bolts are disposed.

9. The apparatus of claim 1, wherein the inboard component has a caliper mounting bracket engagement surface that engages the caliper mounting bracket, wherein the inboard component has a bolt mounting surface that engages the mounting bolts, wherein the bolt mounting surface is oriented at an angle that is greater than zero to the caliper mounting bracket engagement surface, wherein the mounting bolts extend through the inboard component, the caliper mounting bracket, the outboard component, and into the brake calipers and are in threaded engagement with the brake calipers.

10. The apparatus of claim 9, wherein the outboard component includes an upper outboard component and a lower outboard component, wherein the upper outboard component is spaced from and free from contact with the lower outboard component, wherein the correction surface is located on both the upper outboard component and the lower outboard component, wherein the mounting bolts extend through both the upper outboard component and the lower outboard component, wherein the inboard component includes an upper inboard component and a lower inboard component, wherein the upper inboard component is spaced from and free from contact with the lower inboard component, wherein the bolt mounting surface is located on both the upper inboard component and the lower inboard component, wherein the mounting bolts engage and extend through both the upper inboard component and the lower inboard component.

11. The apparatus of claim 10, wherein the upper inboard component, the lower inboard component, the upper outboard component, and the lower outboard component each have a different number of identification holes that identify the upper inboard component, the lower inboard component, the upper outboard component, and the lower outboard component from one another.

12. The apparatus of claim 1, wherein the brake calipers have a first brake pad and a second brake pad that move into engagement with the rotor to stop the rotor from spinning, wherein the first brake pad is located inboard of the rotor, wherein the second brake pad is located outboard of the rotor.

13. The apparatus of claim 12, wherein when the brake calipers are properly positioned with respect to the rotor the first brake pad is in alignment with the rotor and the second brake pad is in alignment with the rotor, wherein when the brake calipers are properly positioned with respect to the rotor the distance from the first brake pad to the rotor is the same as the distance from the second brake pad to the rotor.

\* \* \* \* \*